United States Patent [19]

Iwase et al.

[11] Patent Number: 4,486,933
[45] Date of Patent: Dec. 11, 1984

[54] APPARATUS FOR ASSEMBLING CORE FOR HEAT EXCHANGER

[75] Inventors: Takatoshi Iwase, Anjo; Akira Nakagawa, Kariya, both of Japan

[73] Assignee: Nippondenso Co., Ltd., Kariya, Japan

[21] Appl. No.: 436,821

[22] Filed: Oct. 26, 1982

[51] Int. Cl.³ .............................................. B23D 15/26
[52] U.S. Cl. .......................... 29/157.3 A; 29/157.3 B;
29/157.3 C; 29/726; 29/783; 29/809; 228/5.1;
228/6 R
[58] Field of Search ................... 29/157.3 R, 157.3 A,
29/157.3 B, 157.3 C, 726, 727, 783, 784, 787,
790, 809; 228/5.1, 6 R, 183

[56] References Cited

U.S. PATENT DOCUMENTS 4,321,739 3/1982 Martin et al. .................... 29/726 X Primary Examiner—Howard N. Goldberg
Assistant Examiner—Timothy V. Eley
Attorney, Agent, or Firm—Cushman, Darby & Cushman

[57] ABSTRACT

Method and apparatus for assembling a core for a heat exchanger having front and rear inserts, a predetermined number of tubes and fins which are alternatively arranged between the front and rear inserts, comprising two parallel rows of horizontally moving chain attachments for receiving and carrying these core parts an insert throwing-in station, a tube throwing-in station and a fin throwing-in station, which stations are arranged in this order along the direction of the movement of the chain attachments.

26 Claims, 16 Drawing Figures

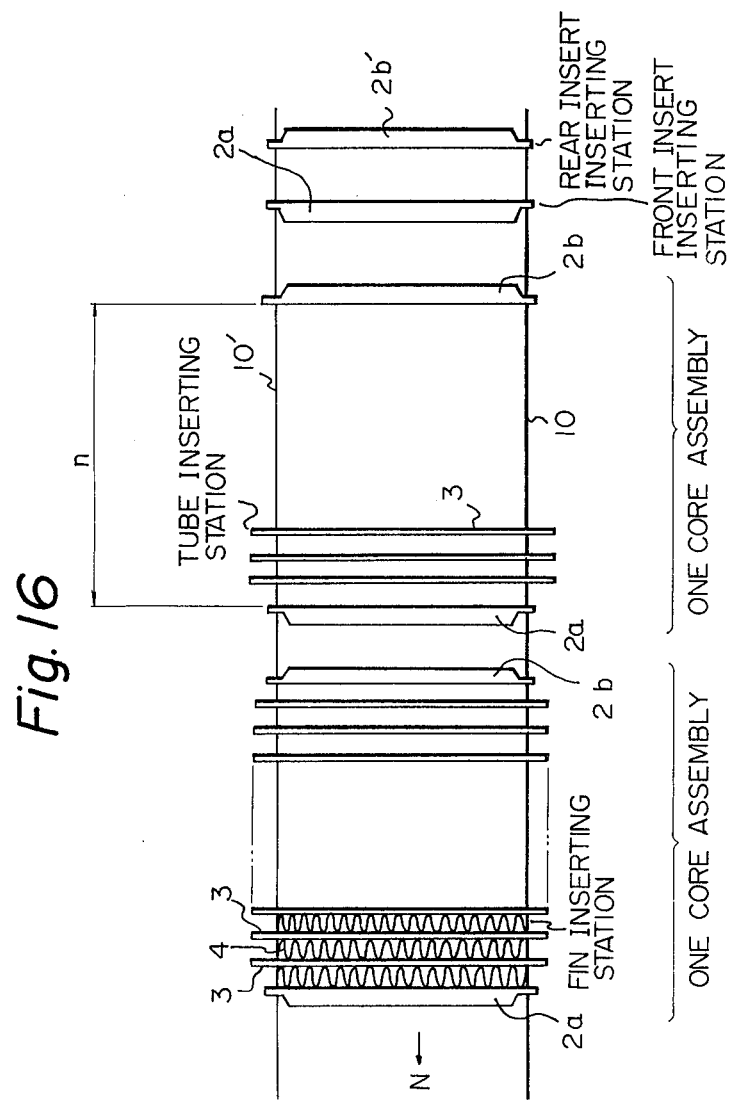

APPARATUS FOR ASSEMBLING CORE FOR HEAT EXCHANGER

BACKGROUND OF THE INVENTION

1. Field of the Invention

The present invention relates to a method and apparatus for assembling a core for a heat exchanger, more particularly, to a method and apparatus for assembling a heat exchanger core allowing a single assembly system to not only assemble a core for ordinary heat exchangers, for example, automobile radiators, but also automatically assemble a core for other heat exchangers of the type having fins and tubes in combination.

2. Description of the Prior Art

In assembling an automobile radiator core, a predetermined number of fins and tubes are alternately arranged on a bottom insert to form a predetermined number of layers. A top insert is then placed on the uppermost tube, and a pair of header plates are secured to the ends of the tubes.

According to the prior art, the above-mentioned operations for assembling the core have all been manually effected. That is, the emplacement of the bottom insert, the alternate stucking of the fins and tubes, the emplacement of the top insert on the uppermost tube, and the attachment of the header plates to the tubes have all been done by hand. These manual operations are troublesome, require highly skilled assemblers, and long assembly time. They also tend to result in products not having a uniform high quality.

SUMMARY OF THE INVENTION

It is a primary object of the present invention to provide apparatus for automatically assembling a core for a heat exchanger in which the foregoing defects of the conventional technique are eliminated and in which the speed of assembling tubes and fins for the heat exchanger core is remarkably increased, full automation of the assembly operation is possible, and a variety of cores differing in core height and the like can be assembled in one assembly system.

In accordance with another aspect of the present invention, there is provided an apparatus for assembling a core for a heat exchanger, which comprises special chain attachments having a space for inserting an insert or tube between two adjacent attachments, which run in two parallel rows in a horizontal direction, and an insert-inserting station, a tube-inserting station, and a fin-inserting station, which are arranged independently along the path of the special chain attachments.

According to the present invention, since inserts, tubes, and fins which are constituent parts of a heat exchanger, for example, a radiator are inserted between two parallel rows of special chain attachments at different stations, the assembly operation can be performed wholly automatically.

Further, according to the present invention, since two parallel rows of special chain attachments are arranged as described above and a rail for receiving parts to be assembled is divided into two sections connected by links of the pantograph type, the core height can be changed by moving one row of special chain attachments, thereby allowing a variety of cores having different core heights to be assembled in one assembly system.

Other objects and features of the present invention will become apparent from the following detailed description.

BRIEF DESCRIPTION OF THE DRAWINGS

In the drawings,

FIG. 16 is a plan view showing the flow of tubes, fins, and inserts, in the direction of the movement thereof.

DETAILED DESCRIPTION OF THE PREFERRED EMBODIMENTS

The present invention will now be described in detail with reference to preferred embodiments illustrated in the accompanying drawings.

Figure 1:
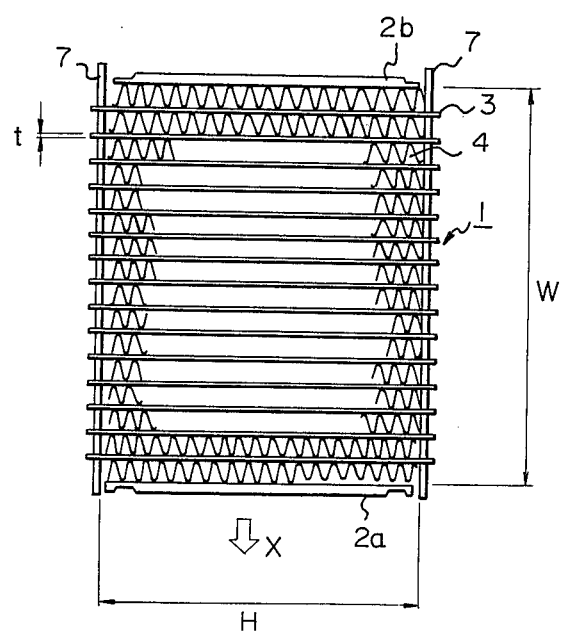
FIG. 1 is a plan view of a radiator core for an automobile, obtained by the present invention.
Figure 2:
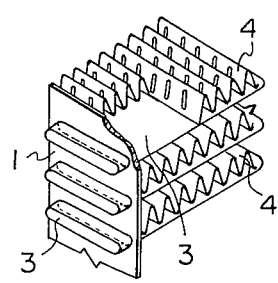
FIG. 2 is an exploded perspective view of a part of the radiator core shown in FIG. 1.

In FIGS. 1 and 2 are shown a typical radiator core 1 for an automobile, in which a predetermined number of tubes 3 and fins 4 are alternately arranged between a pair of inserts 2a and 2b. In the present invention, since the inserts 2a and 2b, which correspond to the before-mentioned bottom and top inserts, respectively, move in the direction shown by an arrow X, the inserts 2a and 2b are referred to as a front insert and a rear insert, respectively. A pair of header plates 7 which have holes corresponding to the tubes 3 are secured to both ends of the tubes 3. When the header plates 7 are secured to the tubes 3, the fins 4 are compressed and strongly compacted. In FIG. 1, the height and the width of the core 1 are represented by H and W, respectively. As can be seen from FIG. 1, if the number of the fins 4 is n, the number of the tubes 3 is represented by n−1.

Figure 3:
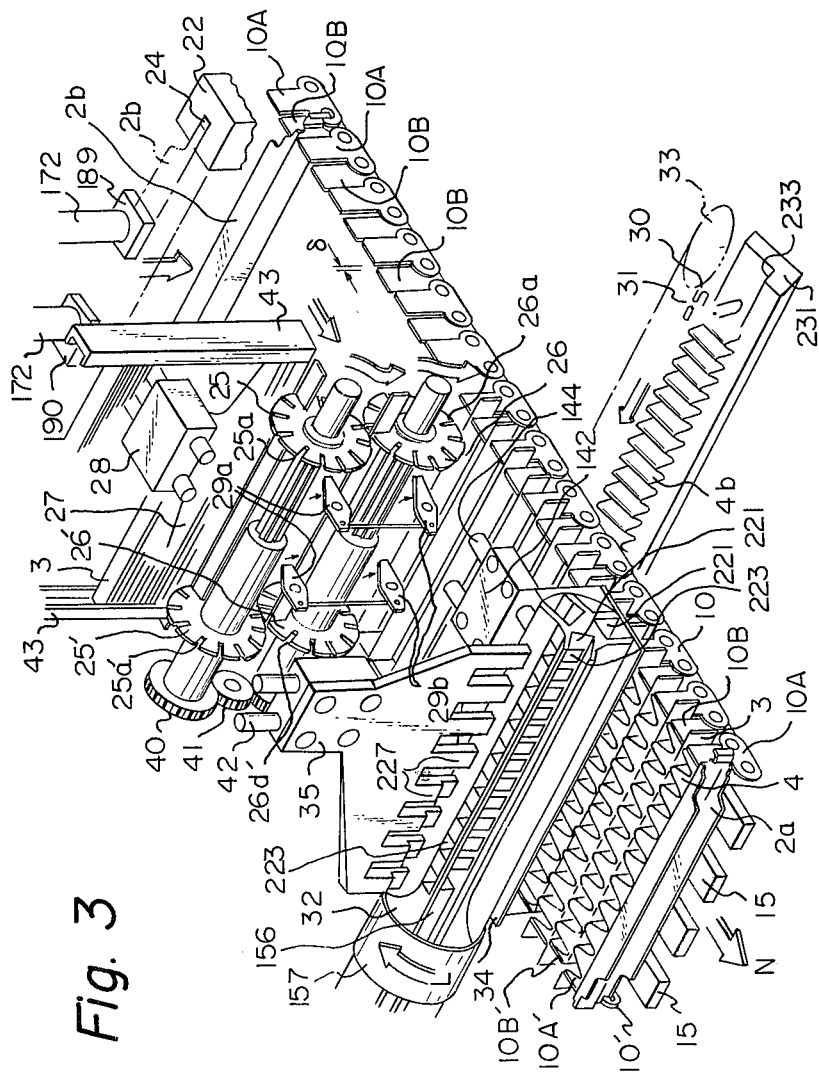
FIG. 3 is a perspective view illustrating an embodiment of the apparatus according to the present invention.

In FIG. 3 is briefly shown the whole arrangement of the apparatus of the present invention. In FIG. 3, reference numerals 10, 10' represent two rows of special endless chain attachments extending parallel to each other in a horizontal direction. Each attachment 10 or 10' has substantially inverted T-shaped chain elements 10A and 10B or 10A' and 10B'. These chain elements 10A and 10B or 10A' and 10B' are linked together at their base ends so as to provide gaps or spaces δ therebetween which can receive therein both the ends of the tubes 3 and of the inserts 2a and 2b. The two parallel chain attachments 10 and 10' are endlessly rotated by means of driving sprocket wheels 7 and 7' (FIG. 10) so that the large part of the movement is a linear movement in the horizontal direction N. That is, the attachments 10 and 10' move, at their large parts, in the horizontal direction to move elements of assembly, i.e. the inserts 2a and 2b, the tubes 3, and the fins 4, in the horizontal direction.

The sprocket wheels 7 are secured to the horizontal drive shafts 44 perpendicular to the direction N of the movement of the chain attachments 10. The sprocket wheels 7' which engage the attachment 10' are secured to the spline bearing 70, which is axially movable with respect to and can rotate together with the drive shafts 44.

Figure 4:
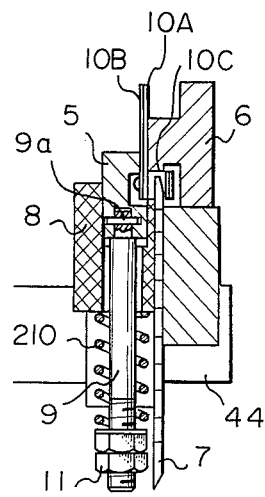
FIG. 4 is a sectional view taken along the line IV—IV in FIG. 5, illustrating a device for maintaining the vertical posture in special chain attachments in the apparatus shown in FIG. 3.
Figure 5:
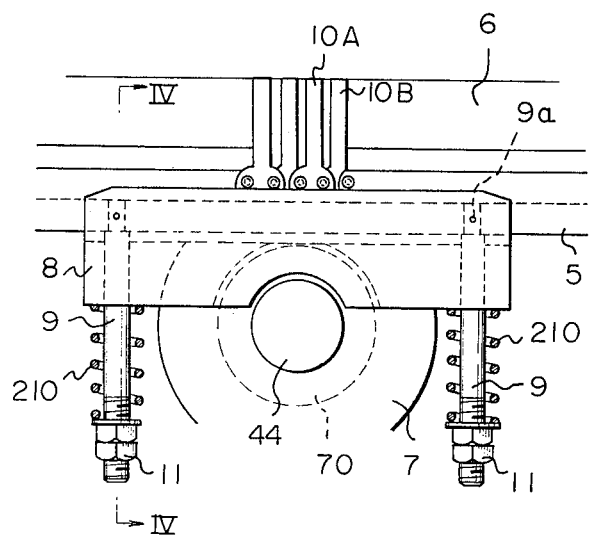
FIG. 5 is a front view illustrating the device shown in FIG. 4.
Figure 7:
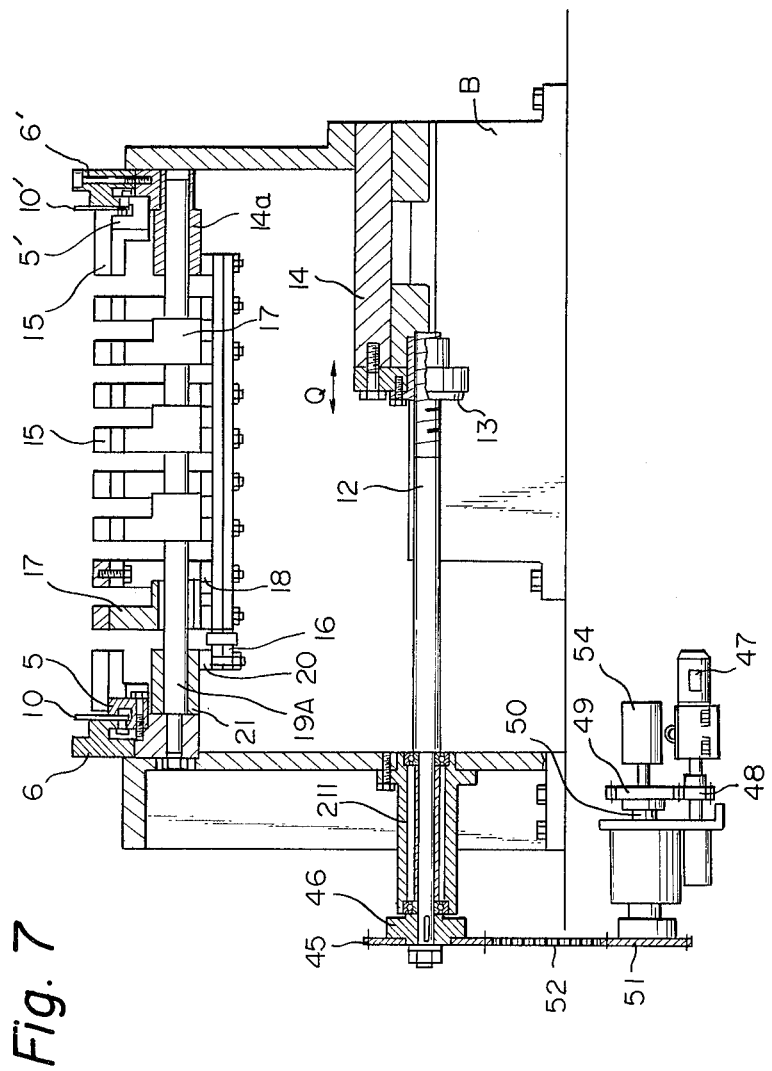

In order to maintain the chain elements 10A, 10B and 10A', 10B' vertical, guides 5, 5' and rails 6, 6' are provided along the paths of the movement of the chain attachments 10, 10' so that the chain elements run between the guides 5, 5' and rails 6, 6', as shown in FIGS. 4, 5, and 7. The chain attachments 10, 10' have rollers 10C, 10C' (only rollers 10C are shown in FIG. 4) which bear against the rails 6, 6' from below with the help of springs 210, 210' (only springs 210 are illustrated in FIGS. 4 and 5). The chain attachments 10 (or 10') have spaced holders 8 which are slightly vertically movable with respect to the guides 5 and which are pressed upward by the springs 210. Screw rods 9 are secured to the guides 5 by means of lock pins 9a and are engaged by lock nuts 11. The springs 210 are arranged between the holders 8 and the lock nuts 11 to press the rollers 10C against the rails 6. The pressure varies in accordance with the spring force of the springs 210, which can be adjusted by the nuts 11.

In order to adjust the height H (FIG. 1) of the core 1, one of the two parallel rows of attachments 10, for example, the attachment 10' move close to and away from the other attachment 10 in parallel motion together with the corresponding guide 5', rail 6', sprocket wheels 7', etc., to increase or decrease the distance between the two attachments 10 and 10'. The spline bearing 70 enables the attachment 10' to move in the axial direction of the drive shafts 44. The guide 5' and the rail 6' are supported by a slide 14 (FIG. 7) which is slidably supported on a base B of the apparatus. On the other hand, the guide 5 and the rail 6 are secured to the base B. The slide 14 is connected to a screw shaft 12 by means of a threaded bearing 13. The screw shaft 12, which is rotatably supported in the base B by means of a bearing 211, is connected, at its opposite end, to a sprocket wheel 45 by means of a sprocket wheel holder 46. The sprocket wheel 45 is connected to a sprocket wheel 51 by means of a belt 52. The sprocket wheel 51 has a rotatable shaft 50 which is, in turn, connected to a stepping motor 47 by means of gears 48 and 49. The numeral 54 designates an encoder which detects the rotational displacement of the screw shaft 12. Consequently, the rotation of the motor 47 is transmitted to the screw shaft 12 which rotates to move the slide 14 in the directions Q (FIG. 7).

Receiving rails consisting of equidistantly spaced parallel elongated plates 15 extend in the direction N of the movement of elements such as the tubes 3, the fins 4, and the inserts 2a, 2b to receive these elements thereon.

Figure 6:
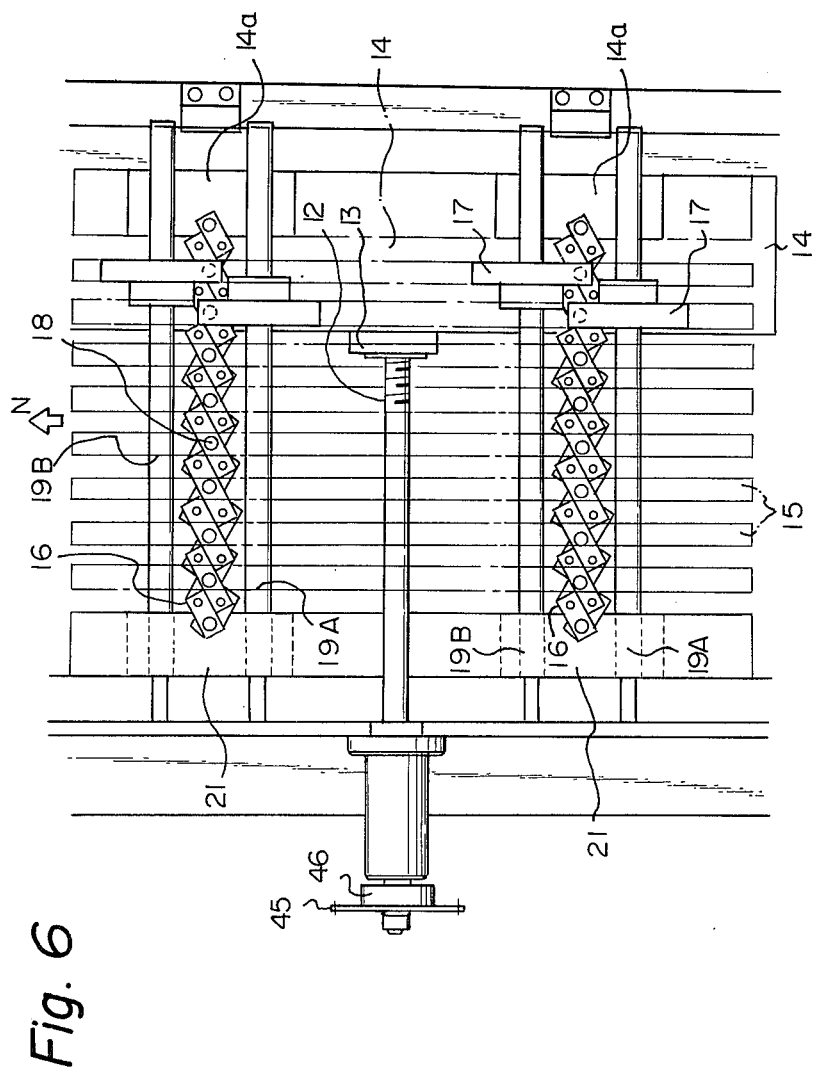
FIGS. 6 and 7 are plan and front views illustrating a mechanism for adjusting the distance between the special chain attachments shown in FIG. 3.

When the distance between the two rows of the chain attachments 10A and 10B is adjusted, the elongated plates must translate so as to maintain the distance between the elongated plates 15 constant. For translation movement, the elongated plates 15 have, for example, two rows of pantograph links 16. The pantograph links 16 are held on a stay 21 by means of pins 20. The elongated plates 15 have sliding supports 17 which are alternatively and slidably supported on guide bars 19A or 19B. For clarification, only one sliding support 17 is shown in FIG. 6 for each guide bar. The guide bars 19A and 19B are held by the stays 21 which is, in turn, secured by the base B. The pantograph links 16 are connected to sleeves 14a of the slide 14, which are slidable on the respective guide bars 19A and 19B. The slide movement of the sleeves 14a in the direction Q (FIG. 7), results in a parallelogram linkage motion on the part of the pantograph links 16, so that the elongated plates 15 translate in parallel motion while keeping uniform distances between the adjacent elongated plates 15. Consequently, the width of the receiving rails can be adjusted.

Figure 14:
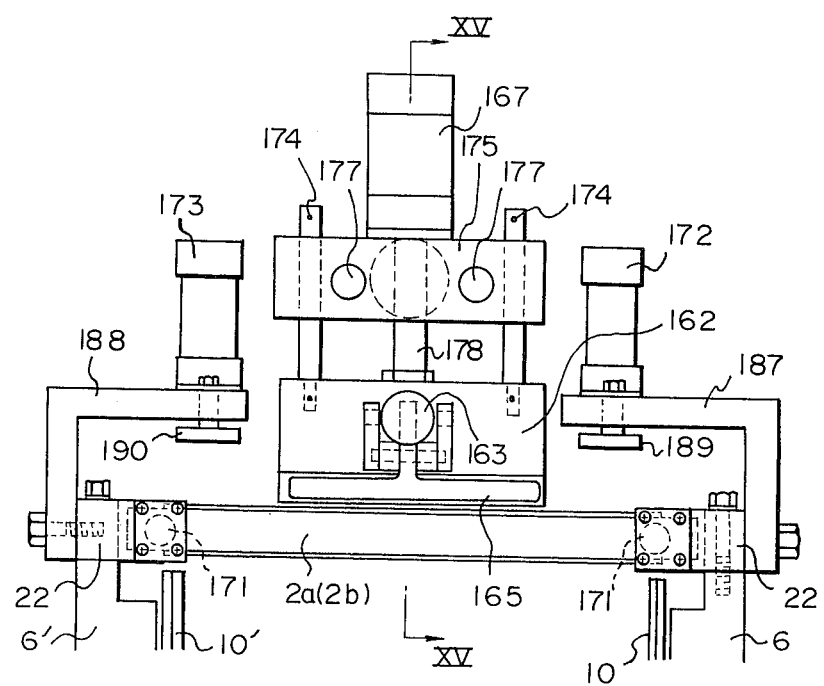
FIG. 14 is a front view of the insert feeding station shown in FIG. 3.
Figure 15:
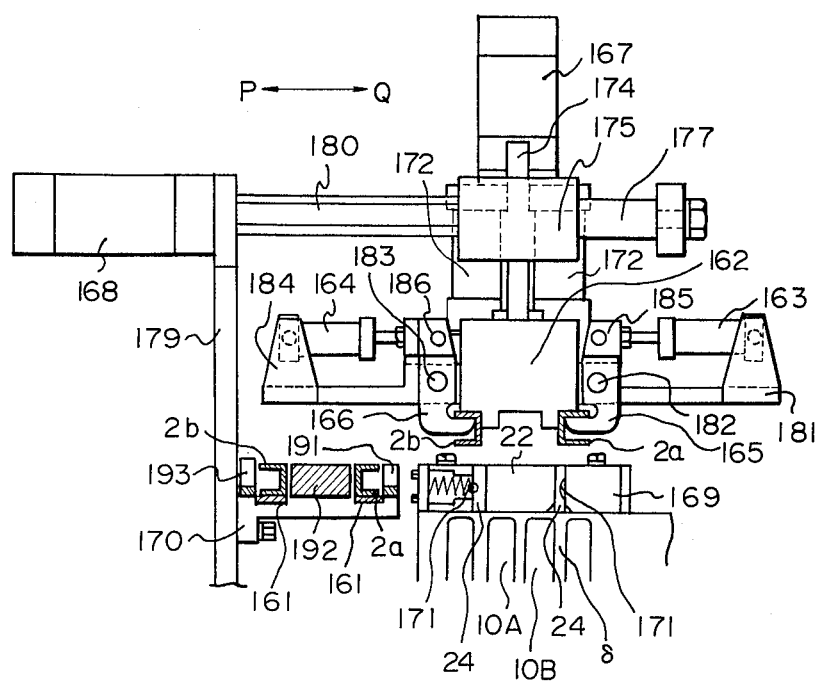
FIG. 15 is a sectional view taken along the line XV—XV in FIG. 14.

A pair of holders 22 for provisional placement of the front and rear inserts 2a and 2b are provided above the chain attachments 10 and 10'. The inserts 2a and 2b can be pushed down from the holders 22 by means of vertically movable pushers 189 and 190. The detailed construction of the insert feeding station is shown in FIGS. 14 and 15.

The holders 22 are secured to the rails 6 and 6' and have recesses 24 which tightly receive therein the ends of the corresponding inserts 2a and 2b. In the recesses 24, spring-biased balls 171 are provided so that parts of the balls project in the recesses 24. The spring-biased balls 171 provisionally hold the inserts 2a, 2b located in the recesses 24. The pushers 189 and 190 are connected to air or hydraulic cylinders 172 and 173 which are, in turn, held on brackets 187 and 188 secured to the rails 6 and 6'. The cylinders 172 and 173 operate to move the pushers 189 and 190 up and down. The inserts 2a and 2b are individually pressed out from the holders 22 by the downward movement of the respective pushers 189 and 190.

An insert loading holder 162 is slidably supported by an insert loading slide 175, along guide bars 174 which are secured to the holder 162 and which extend through the slide 175. The slide 175 is slidably supported on guide bars 177 which horizontally extend from a vertical stand 179 secured to the base B. The slide 175 is connected to a piston rod 180 of an air or hydraulic actuator 168 held on the stand 179 so that the slide 175 can move on and along the guide bars 177 when the cylinder 168 operates.

The insert loading holder 162 is connected to a piston rod 178 of an air or hydraulic cylinder 167 supported on the slide 175 so that the operation of the cylinder 167 moves the holder 162 up and down. Consequently, the holder 162 can move in the vertical direction by means of the cylinder 167 as well as in the horizontal direction by means of the cylinder 168.

The insert loading holder 162 has insert clamping cylinders 163 and 164 which are held by brackets 181 and 182 secured to the holder 162. The cylinders 163 and 164 are pivoted to a pair of opposed clamping arms 165 and 166 which are in turn pivoted to the holder 162 by means of pivots 182 and 183. When the respective cylinders 163 and 164 operate, the clamping arms 165 and 166 can rotate about the pivots 182 and 183 to clamp the inserts 2a and 2b, which have a generally U-shaped cross-section, between the holder 162 and the clamping arms 165, 166.

The inserts 2a and 2b are successively fed by motor-driven conveyor belts 161 which run in the direction perpendicular to the direction N, so that the inserts 2a and 2b come to waiting positions located on extensions of lines connecting the respective insert-receiving recesses 24 of the opposed holders 22. When the inserts 2a and 2b are moved by the conveyor belts 161, the paths of the inserts 2a and 2b are defined by guide walls 191, 192, and 193 which extend along the conveyor belts and which are secured on a supporting plate 170 held by the vertical stand 179.

When the inserts 2a and 2b located at the waiting positions shown in FIG. 15 are taken out therefrom, the insert loading holder 162 comes above the inserts 2a and 2b by the operation of the cylinder 168 and then moves downward to grasp the inserts 2a and 2b by the operation of the cylinder 167. After that, the cylinders 163 and 164 operate to rotate the clamping arms 165 and 166 about the pivots 182 and 183, so that the clamping arms 165 and 166 hold the inserts 2a and 2b with the holder 162, respectively. The guide walls 191 and 193 are formed so that they do not interfer with the rotational movement of the clamping arms 165 and 166.

After the inserts 2a and 2b are held by the clamping arms, the holder 162 moves upward. The slide 175 then moves in the right-hand direction in FIG. 15 so that the holder 162 comes above the insert holders 22. The downward movement of the holder 162 causes the inserts 2a and 2b to enter the corresponding recesses 24 of the holders 22.

Above the chain attachments 10, 10' are arranged two pairs of disc-shaped rotatable tube drums 25, 25' and 26, 26', which are supported on drive shafts 75 and 76 so as to rotate therewith, respectively. The drive shafts 75 and 76 are rotatably supported, for example, by the base B. The drums have radially extending grooves 25a, 25a', 26a, 26a' which are located at an equiangular distance on the peripheries of the respective drums 25, 25', 26, 26', respectively. A pair of opposed grooves 25a and 25a' or 26a and 26a' hold the tube 3 therein. The drums 25' and 26' are slidably supported on the drive shafts 75 and 76 by means of spline bearings 77 and 78 to adjust the distance between the drums 25 and 25' or 26 and 26' in accordance with the variation of the length of the tubes, i.e., the height H (FIG. 1) of the core.

The fins 3 are stacked up in a fin magazine 43 located in front of the drums 25 and 25'. The lowermost fin is successively pushed out from the magazine 43 by means of a pusher plate 27. The pusher plate 27 has a thickness substantially the same as that of one tube 3 and is connected to a slide 28 which is slidably supported on a pair of horizontal guide bars 109. The tubes 3 are successively forced into the corresponding grooves 25a and 25a' of the drum 25 by the pusher plate 27. The mechanism for sliding the slide 28 will be explained later.

Figure 10:
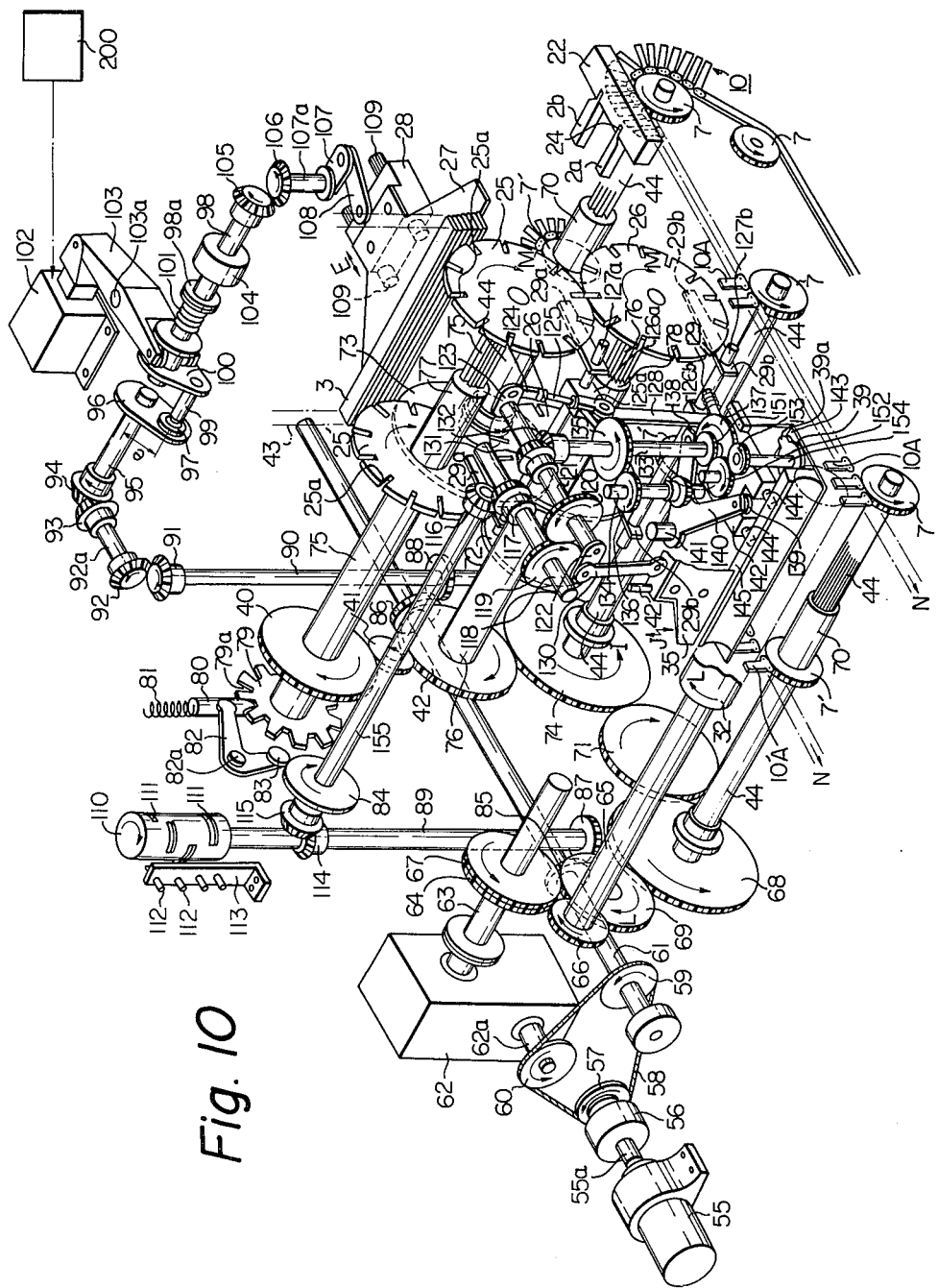
FIG. 10 is a perspective view of a drive mechanism of the apparatus according to the present invention.

The lower drums 26 and 26' are brought into contact with the upper drums 25 and 25' so that the grooves 26a and 26a' are registered with the corresponding grooves 25a and 25a' when the drums 25, 25' and 26, 26' rotate in the same direction M (FIG. 10). Therefore, the tubes 3 press-fitted in the grooves 25a and 25a' of the upper drums 25 and 25' are successively forced into the corresponding grooves 26a and 26a' of the lower drums 26 and 26', with the help of two pairs of upper and lower rocking arms 29a and 29b. The upper rocking arms 29a come in contact with the side wall of the tube when the tube comes to a lower vertical position in which the grooves 25a and 25a' are registered with the corresponding grooves 2, to force the tube out from the grooves 25a and 25a' into the grooves 26a and 26a'.

The lower rocking arms 29b operate simultaneously with and similar to the upper rocking arms 29a to force out the tubes 3 which are forced into the grooves 26a and 26a', from the grooves 26a and 26a' into the gap δ between the chain elements 10A and 10B. The upper and lower rocking arms 29a and 29b are connected to rotational shafts 127a and 127b, respectively, described in detail hereinafter.

For assembly of fins 4, a fin drum 32 is arranged above the chain attachments 10 and 10'. The drum 32 extends perpendicular to the direction N and is supported by a drive shaft 65 (FIG. 10) held by the base B so as to rotate with the drive shaft 65 in direction L (FIG. 3). The drum 32 has for example, three, generally U-shaped longitudinal channels 221 spaced at an equiangular distance on the periphery. The channels 221 are provided, on their bottoms, with through holes 223, in which comb-like projections 227 of a vertically movable inserting plate 35 can be received to insert the fins 4 located in the channels 221 of the drum 32 into the gap S.

When one of the channels 221 is positioned at a lower vertical position at which the channel presents an inverted U-shape, the fin is fed into the adjacent channel 221 on the preceding side viewed from the direction of rotation of the drum 32, referred to as a "fin-receiving channel". For the feed of the fins, there is provided a guide plate 231 having a longitudinal V-shaped guide passage 233, on and along which the fins 4 move. The guide passage 233 is aligned with the length of the fin-receiving channel 221. The channel 221 positioned at the above-mentioned vertical position is referred to as the "fin-inserting channel", because the fins are inserted therefrom into the gap δ between the chain elements 10A and 10B.

Figure 11:
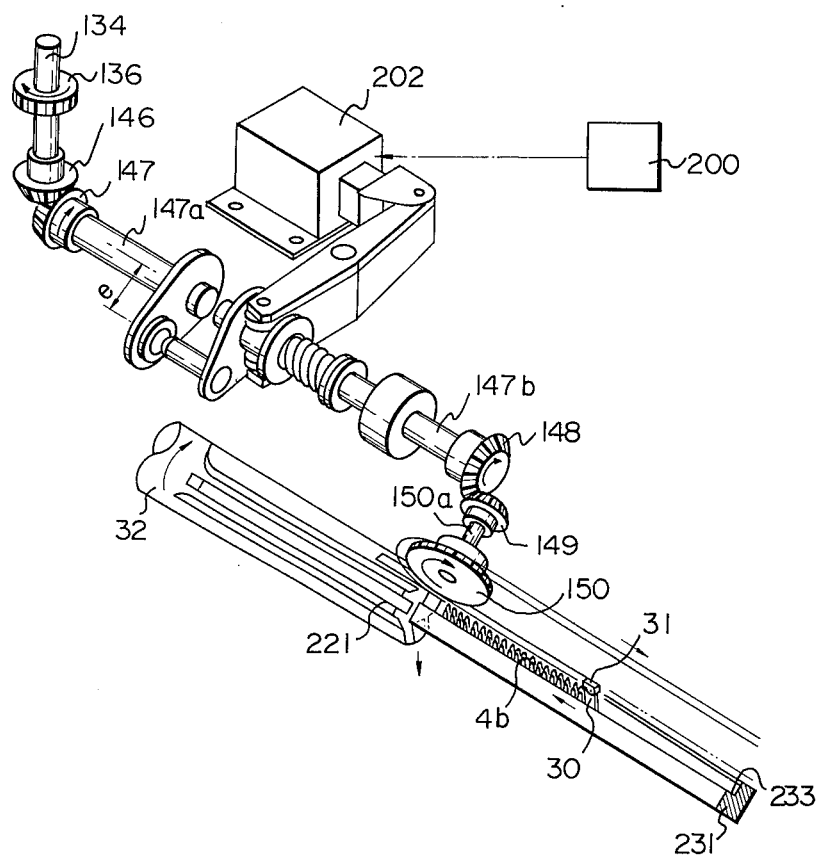
FIG. 11 is a perspective view of a mechanism for driving the fin feeding sprocket shown in FIG. 8.

Above the guide plate 231 is arranged a fin-delivering endless chain 31 which rotates around sprockets 33 (FIG. 3) and 150 (FIG. 11). The drive sprocket 150 is connected to a shaft 134 with a gear 136, by means of bevel gears 149, 148, 147, and 146, as shown in FIG. 11 and explained in detail hereinafter. The endless chain 31 has abutments 30 spaced at a predetermined pitch corresponding to the length of one fin 4 at its free state, so that when the endless chain 31 rotates, the fins 4 can be inserted one by one in the fin-receiving channel 221 by means of the abutments 30.

Figure 9:
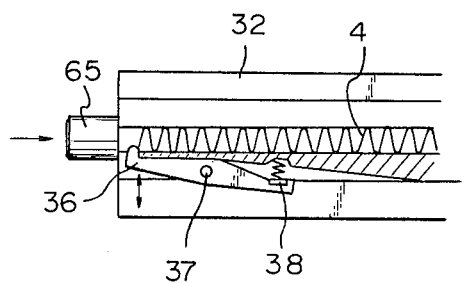

Since the fins 4 are assembled in a compressed state in its longitudinal direction, that is, since the fins 4 are arranged in a compressed state between the two adjacent tubes 3, or between the inserts 2a, 2b and the tubes 3, the fins 4 must be inserted in the fin-receiving channel 221 in a compressed state. For this purpose, each of the channels 221 is provided, on its inlet end, with a claw 36 which can be retracted from the associated channel 221 to enable the fin to enter the channel or can be projected into the associated channel 221 to prevent the fin from coming out from the channel and to keep the fin in the compressed state. The claw 36 is pivoted to the drum 32 by means of a pin 37 and is continuously biased by a spring 38 toward the projecting position, as shown in FIG. 9. The movement of the claw 36 into the retracted position is accomplished by a cam 39 which is connected to a rotational shaft 154 having a gear 153

Figure 8:
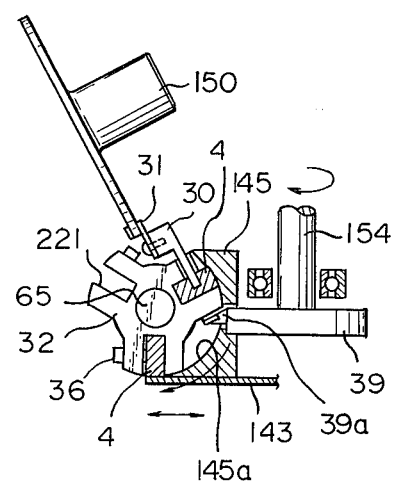
FIGS. 8 and 9 are front and side views illustrating a fin-inserting mechanism in the apparatus shown in FIG. 3.

(FIGS. 8, 10) and which has a cam lobe 39a on the periphery. The cam lobe 39a rotates the claw 36 about the pin 37 against the spring 38 in the counterclockwise direction in FIG. 9, so that the claw 36 comes to the retracted position. The claw 36 normally occupies the projecting position and occupies the retracted position only when the fin 4 is inserted in the fin-receiving channel 221.

A guide block 145 which has an archwise guide surface 145a (FIG. 8) is arranged so that the drum 32 rotates along the guide surface 145a. The cam lobe 39a of the cam 39 can project inward from the guide surface 145a through the guide block 145. The guide block 145 extends over the length of the drum 32 to prevent the fin 4, which has been inserted in the channel 221, from falling or coming out therefrom during the rotation of the drum 32. The arc length of the guide surface 145a is such that the block 145 does not interfere with the inserting operation of the fin, arranged in the fin-inserting channel 221, into the gap δ.

A shutter plate 143 (FIGS. 8 and 10) is provided to selectively open and close the U-shape opening of the fin-inserting channel 221. The shutter plate 143 is slidable in the direction identical to the direction N (FIG. 10) along the bottom surface of the guide block 145. As will be described hereinafter, the movement of the shutter plate 143 is synchronously effected with the movement of the inserting plate 35. The inserting plate 35 slides along guide bars 42 in the vertical direction to insert the fin 4 located in the fin-inserting channel 221 into the gap δ. Therefore, the shutter plate 143 is retracted to open the fin-inserting channel 221 allowing the fin to be inserted into the gap δ with the help of the inserting plate 35, only when the inserting plate 35 moves downward, so that the projections 227 of the inserting plate 35 push down the fin 4 accommodated in the fin-inserting channel 221, into the gap δ.

Figure 12:
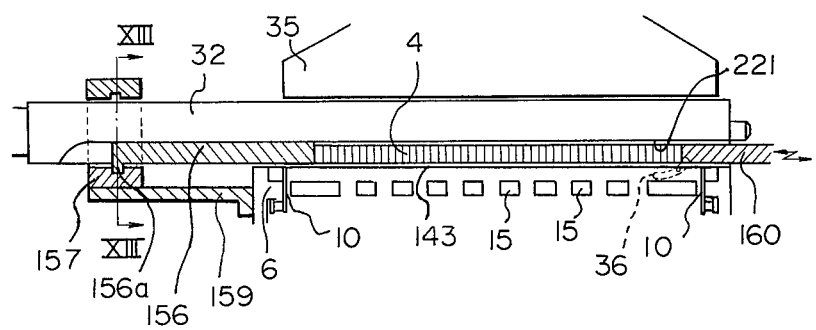
FIG. 12 is a front view of a fin drum having a fin therein, shown in FIGS. 3 and 10.
Figure 13:
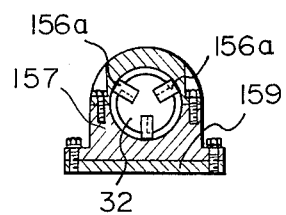
FIG. 13 is a sectional view taken along the line XIII—XIII in FIG. 12.

As can be seen from FIGS. 12 and 13, in order to adjust the length of the compressed fin 4 in accordance with the variation of the height H of the core 1, the drum 32 has movable stops 156 provided in the channels 221. The stops 156 have radial projections 156a which project outward from the drum 32 and which are connected to a slide 157 which is slidably attached on the periphery of the drum 32, so that the stops 156 can move in the direction of the length of the drum 32 together with the slide 157. The slide 157 is secured to a support 159 which is, in turn, secured to the movable rail 6.

The length of the fins 4 in the channels 221 can be thus defined by the movable stop 156 and the claw 36.

In FIG. 10 is shown a drive mechanism of the apparatus of the invention.

A drive motor 55 which is supported on the base B (FIG. 7) has a drive shaft 55a having a clutch 56 of a known type which can be selectively connected to and disconnected from a sprocket wheel 57. The clutch 56 may be an electromagnetic clutch. The sprocket wheel 57 is connected on one hand to a sprocket 60 and on the other hand to a sprocket 59 by an endless chain 58, so that the sprockets 59 and 60 can be simultaneously and synchronously rotated by the motor 55.

The sprocket 60 is connected to an input shaft 62a of an index manifold 62 which produces intermittent rotational movement of an output shaft 63 to index the angular displacements of the tube drums 25, 25' and 26, 26', and the fin drum 32. As the index manifold 62, for example "Roller Gear Index Drive" commercially available by Manifold Co., Ltd. can be used. The sprocket 59 is connected to a shaft 61 extending in the direction parallel to the direction N.

The output shaft 63 of the index manifold 62 has drive gears 64 and 67 connected thereto. The drive gear 64 meshes with a gear 66 connected to the shaft 65 of the fin drum 32. On the other hand, the drive of the drive gear 67 is transmitted to a gear 68 of one of the drive shafts 44, by means of an idle gear 69.

In the illustrated embodiment, three parallel drive shafts 44 are arranged, below the insert holders 22, the tube drums 26, 26', and the fin drum 32, respectively.

The rotation of the gear 68 is transmitted to a gear 74 of the drive shaft 44 located below the tube drums 26, 26', by means of an idle gear 71 and then to a gear 73 of the drive shaft 44 below the insert holders 22, by means of an idle gear 72.

The gear 74 meshes with a gear 42 connected to the shaft 76 of the lower tube drums 26 and 26'. The gear 42 is engaged by a gear 40 of the shaft 75 of the upper tube drums 25 and 25', by means of an idle gear 41. To one end of the tube drum shaft 75 is connected an indexing disc 79 which has indexing V-shaped grooves 79a. The number and angular distance of the grooves 79a correspond to those of the grooves 25a (or 25a') of the tube drum 25 (or 25'). A positioning pin 80 which is biased by a spring 81 supported by an immovable part (not shown) of the base B is selectively fitted in the indexing grooves 79a. The pin 80 can be disengaged from the indexing grooves 79a by a cam lever 82 pivoted thereto at one end. The cam lever 82 is rotatably connected to a pivot pin 82a which is, in turn, secured to the immovable part of the base B. The cam lever 82 has, at the other end, a cam follower 84 which bears against a cam plate 84 secured to a fin-inserting drive shaft 155, so that when the car plate 84 rotates, the pin 80 is continuously fitted in and disengaged from the indexing grooves 79a to rotate the indexing disc 79 and, accordingly, the tube drums 25, 25', every one pitch.

The continuously rotating shaft 61 has screw gears 85 and 86 which are secured thereto and which mesh with screw gears 87 and 88, respectively. The screw gears 87 and 88 are secured to vertical shafts 89 and 90. To an upper end of the vertical shaft 90 is secured a bevel gear 91 which meshes with a bevel gear 92 which is secured to one end of a shaft 92a. The shaft 92a has at its opposite end a bevel gear 93 which meshes with a bevel gear 94 secured to a drive shaft 95 for the tube pusher plate 27. The drive shaft 95 has an arm 96 connected thereto, which has a bush 97 eccentric to the axis of the shaft 95 by eccentricity "e". In the bush 97 can be selectively inserted a clutch pin 99 which is secured to a pin holder 100. The pin holder 100 is held on a shaft 98 so as to rotate with and slide on the shaft 98. The shaft 98 rotatably and slidably extends through a clutch arm 103 which is connected to an solenoid switch 102 and which can rotate about a pivot 103a. The pin holder 100 is rotatably connected to the clutch arm 103. The clutch arm 103 is always biased by a spring 101 arranged between the clutch arm and a flange 98a integral with the shaft 98, toward the arm 96 so that the clutch pin 99 comes into the bush 97. When the clutch pin 97 is inserted in the bush 97, the rotation of the drive shaft 95 is transmitted to the shaft 98. When the solenoid switch 102 is actuated to rotate the clutch arm 103 about the pivot 103a, the clutch arm 103 moves on the shaft 98 toward the flange 98a against the spring 101, so that the pin 99 is disconnected from the bush 97. When the connection between the pin 99 and the bush 97 is broken, the rotation of the drive shaft 95 is no longer transmitted to the shaft 98. This clutch mechanism is provided for selectively stopping the feed of the tubes 3 into the tube drums 25 and 25', since no feed of the tubes 3 into the gaps δ is necessary between the rear insert 2b and the front insert 2a of the subsequent core assembly, as can be seen from FIG. 16.

Even when the connection between the pin 99 and the bush 98 is broken, the shaft 98 tends to continue rotating due to inertia. In order to prevent this rotation of the shaft 98 due to inertia, a brake 104 is preferably provided on the shaft 98. As the brake 104, for example, a conventional electromagnetic brake on the market can be used, which operates in response to the operation of the solenoid switch 102. To one end of the shaft 98 is secured a bevel gear 105 which meshes with a bevel gear 106 connected to a crank arm shaft 107a. The crank arm shaft 107a has a crank arm 107 rotatable therewith. The crank arm 107 has a crank rod 108 pivoted thereto which is, in turn, pivoted to the slide 28. When the crank arm 167 rotates together with the shaft 107a about an axis of the shaft 107a, the slide 28 reciprocatively moves along the guide bars 109 in the horizontal directions E to push the tubes 3 located in the tube magazine 43 into the tube grooves 25a and 25a' of the tube drums 25 and 25', one by one.

The vertical shaft 89 has at its upper end a cylindrical dog holder 110 which is provided, on its periphery, with dogs 111 which control timings of the insertion of the inserts 2a and 2b into the gaps δ, the number of the tubes 3 and fins 4 to be incorporated into one core assembly, and operation of the solenoid switch 102. Sensors 112 are held on a sensor holder 113 which is secured to an immovable part (not shown) integral with the base B to detect the dogs 111. The sensors 112 selectively come into contact with the corresponding dogs 111 when the dog holder 110 rotates in a direction shown by an arrow in FIG. 10, to feed output signals to a control box 200. The sensors 112 which may be electrical switches operate only when they contact with the corresponding dogs 111. The dogs 111 are distributed on the periphery of the dog holder 110 so that they control the timings of insertion of the inserts 2a and 2b, the number of the tubes 3 and fins 4, and the operation of the solenoid switch 102, as mentioned above. This kind of cylindrical dog holder with dogs is usually called a "one rotation cam shaft".

The vertical shaft 89 has a bevel gear 114 secured thereto, which meshes with a bevel gear 115 of the shaft 155. The shaft 155 has a bevel gear 116 which meshes with a bevel gear 117 secured to a shaft 118 extending parallel to the shaft 61. The shaft 118 also has a gear 119 which is engaged by a gear 120 of a shaft 121 extending parallel to the shaft 118. The shaft 121 has, at its opposed ends, crank arms 122 and 123 secured thereto so as to rotate together with the shaft 121. The crank arm 123 is connected, by means of a pivot joint 124, to a rod 125 which is, in turn, connected to an upper arm 126a by means of a pivot joint 125a. The arm 126a is secured to the shaft 127a which has the upper rocking arms 29a which are adapted to withdraw the tubes 4 fitted in the grooves 25a and 25a' of the tube drums 25 and 25' one by one, therefrom, into the corresponding grooves 26a and 26a' of the lower tube drums 26 and 26' as mentioned before. Consequently, the rotation of the shaft 121 causes the shaft 127a and, accordingly, the rocking arms 29a to rotate to withdrew the tubes from the tube drums 25 and 25', one by one.

The rod 125 is also connected by means of a vertical crank rod 128 to a lower arm 126b which is secured to the lower shaft 127b having the lower rocking arms 29b, which are adapted to withdraw the tubes 4 fitted in the grooves 26a and 26a' of the lower tube drums 26 and 26' therefrom into the gaps δ, one by one. That is, the upper and lower rocking arms 29a and 29b are actuated simultaneously by the common drive shaft 121.

The crank arm 122 is connected, by means of a crank rod 130, to the fin-inserting plate 35, which is slidable on the guide bars 42 up and down.

To the center of the shaft 121 is secured a bevel gear 131 which meshes with a bevel gear 132 of a shutter driving vertical shaft 133 which has a gear 135. The gear 135 is engaged by a gear 136 of a fin-inserting vertical drive shaft 134 (FIGS. 10 and 11).

The shutter driving shaft 133 has a cam plate 137 which bears with the help of a spring 129 against a cam follower 138 of a cam 140, which is slidably supported on a vertical shaft 141. The cam 140 is pivoted, by means of a pivot joint 139, to a slide 142 which is slidably supported on a pair of parallel horizontal guide bars 144 extending in the direction N. The shutter 143 (FIGS. 8 and 10) is secured to the slide 142 so as to selectively open and close the opening of the fin-inserting channel 221, as mentioned before.

The fin inserting drive shaft 134, which is rotated by the shaft 133 by means of the gears 135 and 136, has a bevel gear 146 which meshes with a bevel gear 147 of a shaft 147a perpendicular to the shaft 133. The rotation of the shaft 147a is selectively transmitted to a coaxial shaft 147b by means of a clutch mechanism having a solenoid switch 202. The shaft 147b is connected to a horizontal shaft 150a by means of a bevel gear 148 of the shaft 147a and by means of a bevel gear 149 of the shaft 150a engaging with the bevel gear 148, as shown in FIG. 11. The shaft 150a has the before-mentioned drive sprocket 150. The elements of the clutch mechanism are the same as those of the afore-mentioned clutch mechanism having the solenoid switch 102 for the tube drums and, accordingly, no further explanation is given herein.

The shaft 133 also has a gear 151 which is connected, by means of an idle gear 152, to a gear 153 of the vertical shaft 154 of the cam 39.

Unless otherwise specified the shaft, rods, and bars as mentioned above are all supported by the base (body) B or parts integral therewith.

The apparatus of the present invention operates as follows.

Two parallel rows of special attachments 10 and 10' are run in the horizontal direction N. At the same time, the tube drums 25, 25' and 26, 26' rotate in the direction M (FIG. 10) and the fin drum 32 rotates in the direction L (FIG. 10).

Apart from the above, at the initial stage, inserts 2a and 2b are inserted into the gap δ between the chain attachments 10 and 10'. Insertion of the inserts 2a and 2b is accomplished by provisional placement of the inserts 2a and 2b within the pair of holders 22 and pushing down them therefrom by the pushers 189 and 190 which are displaced downward by the operation of the insertion cylinders 172 and 173.

At the first time, only the front insert 2a needs to be inserted into the gap δ. For this purpose, the cylinder 168 operates to bring the insert loading holder 162 and, accordingly, the insert clamping arms 165, 166, above the corresponding inserts 2a and 2b located in the waiting position on the conveyor belts 161. Then, the cylinder 167 operates to move the insert loading holder 162 downward. After that, the cylinder 163 operates to actuate the clamping arm 165 so that the front insert 2a is clamped by the clamping arm 165. The cylinder 167 operates to move the loading holder 162 upward and the cylinder 168 operates to move the holder 162 in the right hand direction Q in FIG. 15 so that the front insert 2a held by the clamping arm 165 comes above the insert holders 22. Then, the cylinder 167 operates to move the holder 162 downward so that the front insert 2a is inserted into the corresponding grooves 24 of the insert holders 22. After the front insert 2a is provisionally located in the grooves 24, the cylinder 163 operates to release the clamping arm 165 from the front insert 2a. After that, the cylinder 167 operates to move the insert loading holder 162 upward and, then, the cylinder 168 operates to move the insert loading holder 162 in the left hand direction P in FIG. 15, so that the insert loading holder 162 is prepared for the second time cycle. After that, the cylinders 172 and 173 operate to move the pushers 189 and 190 downward, so that the front insert 2a which is provisionally held by the holders 22 can be inserted in the gap δ. After the front insert 2a is inserted into the corresponding gap δ, a counter (not shown) counts the number of the gaps δ to determine the time at which the tubes 3 and the fins 4 begin to be inserted in the gaps δ. When the counter counts up the predetermined number of the gaps δ, the tubes 3 are successively inserted into the gaps δ at the tube-inserting station (FIG. 16) from the lower tube drums 26 and 26' which successively receive the tubes 3 from the upper tube drums 25 and 25'.

The drive shafts 75 and 76 of the tube drums 25, 25' and 26, 26' intermittently rotate in accordance with the intermittent rotation of the output shaft 63 of the index manifold 62, by one pitch corresponding to the angular distance between the grooves 25a (25a', 26a, or 26a'). The fin drum 32 also intermittently rotates by one pitch of 120° in the illustrated embodiment in which the fin drum 32 has the three fin receiving channels 221. The claw 36 and the shutter plate 143 are driven to enable the fins 4 to come in and out from the channels, respectively, in accordance with the pitched rotation of the fin drum 32. The fins 4 are successively inserted into the fin-receiving channels 221 by the endless chain 31 which is continuously driven by the shaft 61, in accordance with the pitched rotation of the fin drum 32. The fins 4 are successively inserted between the front insert 2a and the front tube 3 and between the adjacent tubes 3, at the fin-inserting station in FIG. 16.

After the second cycle, the rear insert 2b is first inserted in the gap δ at the rear insert inserting station, and, then, the front insert 2a is inserted in the associated gap δ at the front-insert-inserting station after the rear insert 2a has past there. That is, a rear insert of a core assembly and a front insert of the succeeding core assembly are successively inserted in the associated gaps δ at the respective insert-inserting stations in such a way that the rear insert is first inserted in and the front insert is then inserted in after the rear insert has past the front insert-inserting station.

Between the rear insert of one core assembly and the front insert of the succeeding core assembly is provided a predetermined space S in which neither a tube nor fin should be inserted. In order to stop the feed of tubes and fins, the solenoid switches 102 and 202 are actuated to break the mechanical connection between the shafts 95 and 98 (FIG. 10) and between the shafts 147a and 147b, in accordance with signals from a counter unit which counts the number of the gaps δ, or the fins 4 or the tubes 3. During the actuation of the solenoid switch 102, the shaft 98 does not operate so that the tubes are not fed into the upper tube drums 25 and 25'.

When it is desired to change the core height, that is, the height H shown in FIG. 1, the screw shaft 12 is rotated to adjust the distance between the two sections of the rails 15. Accordingly, a variety of cores differing in the height H can be assembled in one assembly system according to the present invention. Furthermore, the width of the core can optionally be changed by changing the distance between the inserts 2a and 2b by changing the number of the chain elements 10A, 10B and 10A', 10B' by the counter.

As will be apparent from the foregoing description, the following effects can be attained when the method and apparatus for assembling a core for a heat exchanger according to the present invention are utilized.

In the first place, since inserts, tubes, and fins are independently inserted between two parallel rows of the chain attachments at different positions, the speed of assembling a heat exchanger core can be increased. An actual test showed the assembly speed was increased to 4 times the assembly speed of the conventional method.

Further, since the operations of inserting inserts, tubes, and fins can be performed automatically at different stations independently, full automation of assembly of a heat exchanger core becomes possible.

Still further, by the provision of the mechanism for adjusting the distance between a pair of parallel chain attachments by utilizing the parts-receiving rails consisting of the parallel elongated plates, the core height can freely be changed and assembly of a variety of cores differing in core height can be accomplished advantageously. Since this mechanism is constructed to be automatically operable, it does not inhibit full automation of the assembly operation.

We claim:

1. An apparatus for assembling a core for a heat exchanger having front and rear inserts, a predetermined number of tubes and fins which are alternatively arranged between the front and rear inserts, comprising a body, endless chain attachment means supported by the body and capable of moving in a predetermined direction, said means having a number of chain elements spaced at a predetermined gap for receiving the inserts, tubes, and fins in the direction of the movement of the chain attachment means, a drive connected to the chain attachment means to continuously drive the same, a station for inserting the front and rear inserts into the corresponding gaps of the chain elements, a station for inserting the tubes into the corresponding gaps of the chain elements between the front and rear inserts, and a station for inserting the fins between the front insert and the frontmost tube, between the adjacent tubes and between the rear insert and the rearmost tube, said stations being arranged along the direction of the movement of the chain attachment means.

2. An apparatus for assembling a core for a heat exchanger having front and rear inserts, a predetermined number of tubes and fins which are alternatively arranged between the front and rear inserts, comprising a body, two parallel rows of endless chain attachments supported by the body, each being capable of simultaneously moving in a horizontal direction and each having a number of chain elements spaced at a predetermined gap for receiving the inserts, tubes, and fins in the direction of the movement of the chain attachments, a drive connected to the chain attachments to simultaneously and continuously drive the same, a station for inserting the front and rear inserts from above into the corresponding gaps of the chain elements, a station for inserting the tubes from above into the corresponding gaps of the chain elements between the front and rear inserts, and a station for inserting the fins from above between the front insert and the frontmost tube, between the adjacent tubes and between the rear insert and the rearmost tube, said stations being arranged in this order along the direction of the movement of the chain attachments.

3. An apparatus according to claim 2, wherein said insert-inserting station comprises a rear-insert-inserting station and a separate front-insert-inserting station, these two insert-inserting stations being arranged in this order in the direction of advance of the chain attachments.

4. An apparatus according to claim 2, wherein said insert-inserting station comprises holding means above the chain attachments for provisionally holding the front and rear inserts and means for pushing them out of the holding means into the corresponding gaps of the chain elements.

5. An apparatus according to claim 4, further comprising means for holding the inserts located at a waiting position provided on one side of the chain attachments at the insert-inserting station and for carrying the inserts into the holding means.

6. An apparatus according to claim 2, wherein said tube-inserting station comprises a tube magazine which can store a plurality of tubes put one on top of another, a pusher connected to the drive for pushing the tubes out of the tube magazine one by one, and at least one tube drum extending perpendicular to the direction of advance of the chain attachments for receiving the tubes pushed out from the tube magazine and for feeding them into the gaps of the chain elements.

7. An apparatus according to claim 6, wherein said tube drum comprises a pair of upper rotatable disc plates and a pair of lower rotatable disc plates which rotate while coming in contact with the corresponding upper disc plates, said upper and lower disc plates being provided, on their peripheries, with predetermined pitched grooves adapted to receive the tubes, said grooves of the upper disc plates being registered with those of the lower disc plates during the rotation of the upper and lower disc plates.

8. An apparatus according to claim 7, further comprising means connected to the drive for forcing the tubes located in the grooves of the upper disc plates into the corresponding grooves of the lower disc plates and for forcing the tubes located in the grooves of the lower disc plates into the corresponding gaps of the chain elements.

9. An apparatus according to claim 8, further comprising clutch means between the drive and the pusher for selectively breaking the mechanical connection therebetween.

10. An apparatus according to claim 2, further comprising means connected to the drive for converting the continuous rotation to intermittent rotation.

11. An apparatus according to claim 2, wherein said fin-inserting station comprises a fin drum which extends perpendicular to the directon of advance of the chain attachments and which is connected to the converting means, said fin drum having longitudinal channels for receiving the fins in a compressed state.

12. An apparatus according to claim 11, further comprising means for feeding the fins into the longitudinal channels of the fin drum.

13. An apparatus according to claim 12, wherein said fin feeding means comprises a guide plate extending in alignment with one of the longitudinal channels of the fin drum for supporting thereon the fins and an endless chain connected to the drive for carrying the fins into the one longitudinal channels along and on the guide plate.

14. An apparatus according to claim 13, further comprising means connected to the drive for pushing the fins located in the longitudinal channels of the fin drum out therefrom into spaces between the inserts and the tubes and between the adjacent tubes.

15. An apparatus according to claim 13, further comprising clutch means between the endless chain and the drive for selectively breaking the mechanical connection therebetween.

16. An apparatus according to claim 13, further comprising means for preventing the compressed fins in the longitudinal channels of the fin drum from coming out of the longitudinal channels in the direction of the length of the longitudinal channels.

17. An apparatus according to claim 16, wherein said preventing means comprises claws which are pivoted to the fin drum and which normally project into the longitudinal channels and retract therefrom only when the fins are inserted into the longitudinal channels.

18. An apparatus according to claim 17, further comprising a cam connected to and driven by the drive for actuating the claws.

19. An apparatus according to claim 13, further comprising shutter means for preventing the fins in the longitudinal channels from falling down therefrom, and actuator means connected to and driven by the drive for actuating the shutter means so that the latter selectively opens the longitudinal channels.

20. An apparatus according to claim 2, further comprising supporting means between the two rows of chain attachment for holding the inserts, tubes, and fins thereon when these parts are thrown in the gaps of the chain elements.

21. An apparatus according to claim 2, further comprising drive pulleys engaged by the chain attachment and drive shafts which support the drive pulleys and which are connected to and driven by the drive.

22. An apparatus according to claim 21, wherein the pulleys engaged by one of the chain attachments are axially movable on the associated drive shafts.

23. An apparatus according to claim 22, further comprising means for adjusting the distance between the two rows of chain attachments.

24. An apparatus according to claim 23, wherein said adjusting means comprises a screw shaft which is screw-engaged by the chain attachment that has the axially movable pulleys so that the screw shaft rotates to axially move the chain attachment in order to adjust the distance between the chain attachments.

25. An apparatus according to claim 20, wherein said supporting means comprises a plurality of parallel elongated plates which extend along and between the chain attachments and which are slidably supported by shafts connected to the body.

26. An apparatus according to claim 25, further comprising a pantograph link mechanism connected to the elongated plates for moving the same while keeping the parallel relationship between the elongated plates.

* * * * *